(12) United States Patent
Jung

(10) Patent No.: US 12,062,129 B2
(45) Date of Patent: Aug. 13, 2024

(54) ITERATIVE SYNTHESIS OF VIEWS FROM DATA OF A MULTI-VIEW VIDEO

(71) Applicant: Orange, Issy-les-Moulineaux (FR)

(72) Inventor: Joël Jung, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 140 days.

(21) Appl. No.: 17/790,301

(22) PCT Filed: Dec. 15, 2020

(86) PCT No.: PCT/FR2020/052454
§ 371 (c)(1),
(2) Date: Jun. 30, 2022

(87) PCT Pub. No.: WO2021/136895
PCT Pub. Date: Jul. 8, 2021

(65) Prior Publication Data
US 2023/0053005 A1   Feb. 16, 2023

(30) Foreign Application Priority Data

Jan. 2, 2020 (FR) ...................................... 2000015

(51) Int. Cl.
*G06T 15/20* (2011.01)
*G06T 5/50* (2006.01)
(Continued)

(52) U.S. Cl.
CPC .............. *G06T 15/205* (2013.01); *G06T 5/50* (2013.01); *G06T 7/536* (2017.01); *G06T 15/04* (2013.01);
(Continued)

(58) Field of Classification Search
CPC ......... G06T 15/205; G06T 5/50; G06T 7/536; G06T 15/04; G06T 2207/20221;
(Continued)

(56) References Cited

U.S. PATENT DOCUMENTS 10,057,562 B2 *   8/2018   Cabral ................. H04N 13/257
10,776,982 B2 *   9/2020   Risser ..................... G06T 17/20
(Continued)

FOREIGN PATENT DOCUMENTS

WO   2017080420 A1   5/2017

OTHER PUBLICATIONS

English translation of the Written Opinion of the International Searching Authority dated Mar. 25, 2021 for corresponding International Application No. PCT/FR2020/052454, filed Dec. 15, 2020.
(Continued)

*Primary Examiner* — YuJang Tswei
(74) *Attorney, Agent, or Firm* — David D. Brush; Westman, Champlin & Koehler, P.A.

(57) ABSTRACT

Synthesis of an image of a view from data of a multi-view video. The synthesis includes an image processing phase as follows: generating image synthesis data from texture data of at least one image of a view of the multi-view video; calculating an image of a synthesised view from the generated synthesis data and at least one image of a view of the multi-view video; analysing the image of the synthesised view relative to a synthesis performance criterion; if the criterion is met, delivering the image of the synthesised view; and if not, iterating the processing phase. The calculation of an image of a synthesised view at a current iteration includes modifying, based on synthesis data generated in the current iteration, an image of the synthesised view calculated during a processing phase preceding the current iteration.

19 Claims, 5 Drawing Sheets

(51) Int. Cl.
*G06T 7/536* (2017.01)
*G06T 15/04* (2011.01)
*H04N 13/111* (2018.01)
*H04N 13/282* (2018.01)
*H04N 13/349* (2018.01)
*H04N 19/597* (2014.01)

(52) U.S. Cl.
CPC ......... *H04N 13/111* (2018.05); *H04N 13/349* (2018.05); *H04N 19/597* (2014.11); *G06T 2207/20221* (2013.01); *H04N 13/282* (2018.05)

(58) Field of Classification Search
CPC .. H04N 13/111; H04N 13/349; H04N 19/597; H04N 13/282
See application file for complete search history.

(56) References Cited

U.S. PATENT DOCUMENTS

| | | | | |
|---|---|---|---|---|
| 2004/0252230 A1* | 12/2004 | Winder | .......... | H04N 21/440281 348/E7.071 |
| 2008/0150955 A1* | 6/2008 | Ndjiki-Nya | ........... | G06T 11/001 345/582 |
| 2013/0271565 A1* | 10/2013 | Chen | .................... | H04N 19/597 348/42 |
| 2014/0241433 A1* | 8/2014 | Bosse | .................. | H04N 19/463 375/240.16 |
| 2014/0247873 A1* | 9/2014 | Bosse | .................... | H04N 19/52 375/240.12 |
| 2014/0307786 A1* | 10/2014 | Deng | ................... | H04N 19/597 375/240.12 |
| 2014/0313290 A1* | 10/2014 | Tech | .................... | H04N 13/161 348/43 |
| 2016/0050440 A1* | 2/2016 | Liu | ......................... | H04N 19/96 348/43 |
| 2016/0171657 A1* | 6/2016 | Matson | ..................... | G06T 5/50 382/299 |
| 2017/0140514 A1* | 5/2017 | Amirghodsi | .............. | G06T 5/77 |
| 2018/0012401 A1* | 1/2018 | Bérard | .................... | G06T 15/04 |
| 2019/0043242 A1* | 2/2019 | Risser | ..................... | G06T 15/04 |

OTHER PUBLICATIONS

Ndjiki Nya P. et al., "Depth Image-Based Rendering with Advanced Texture Synthesis for 3-D Video", IEEE Transactions on Multimedia, IEEE Service Center, US, vol. 13, No. 3, Jun. 1, 2011 (Jun. 1, 2011)., pp. 453-465, XP011479793.

Jung Yong Ju et al., "Critical Binocular Asymmetry Measure for the Perceptual Quality Assessment of Synthesized Stereo 3D Images in View Synthesis", IEEE Transactions on Circuits and Systems for Video Technology Institute of Electrical and Electronics Engineers, US, vol. 26, No. 7, Jul. 1, 2016 (Jul. 1, 2016), pp. 1201-1214, XP011616460.

Dong Tian et al., "View Synthesis Techniques for 3D Video", Applications of Digital Image Processing XXXII, San Diego, CA, Sep. 2, 2009 (Sep. 2, 2009), p. 74430T, XP055041884.

International Search Report dated Mar. 18, 2021 for corresponding International Application No. PCT/FR2020/052454, Dec. 15, 2020.

Written Opinion of the International Searching Authority dated Mar. 18, 2021 for corresponding International Application No. PCT/FR2020/052454, filed Dec. 15, 2020.

* cited by examiner

ITERATIVE SYNTHESIS OF VIEWS FROM DATA OF A MULTI-VIEW VIDEO

CROSS-REFERENCE TO RELATED APPLICATIONS

This Application is a Section 371 National Stage Application of International Application No. PCT/FR2020/052454, filed Dec. 15, 2020, which is incorporated by reference in its entirety and published as WO 2021/136895 A1 on Jul. 8, 2021, not in English.

FIELD OF THE INVENTION

The present invention relates in general to the field of image synthesis. The present invention applies more particularly to the synthesis of uncaptured intermediate viewpoints on the basis of images of multiple 2D (two-dimensional), 360°, 180°, etc., views, which are captured in order to generate an immersive video, such as in particular a 360°, 180°, etc., video.

The invention can in particular, but not exclusively, apply to the video decoding performed in current HEVC (abbreviation of "High Efficiency Video Coding"), and its extensions MV-HEVC (abbreviation of "Multiview HEVC"), 3D-HEVC, etc., video decoders.

PRIOR ART

In an immersive video context, i.e. where the viewer has the sensation of being immersed in a 3D (three-dimensional) scene, the scene is conventionally captured by a set of cameras. These cameras may be:
- of 2D type, in order to capture a particular angle of the scene, and/or
- of 360°, 180° or other type, in order to capture all of the scene over 360 degrees, 180 degrees, or other, around the camera.

The images of such captured views are conventionally encoded, and then decoded by the terminal of the viewer. However, in order to deliver adequate quality of experience, and therefore visual quality and a good degree of immersion, displaying the captured views is not enough. The images of a multitude of views, referred to as intermediate views, need to be computed on the basis of the decoded images of the views.

The images of these intermediate views are computed by means of a view "synthesis" algorithm. A synthesis algorithm is capable, on the basis of images of N views, with N≥1, of synthesizing an image of an intermediate viewpoint located anywhere in space.

The image of a given view among N comprises a texture component and a depth map that indicates the distance separating the various elements of the scene from the camera that has captured the image of this view. Thus, the image of an intermediate view obtained by synthesis also comprises a texture component synthesized on the basis of the N texture components of the images of the N views.

For a given view among N, the depth map is either captured or computed on the basis of the N texture components. However, in both cases, such a depth map may contain numerous errors which are related to the capture, related to the computing, or related to the compression of the images of the N views.

Such errors therefore inevitably have an impact on the image of a view synthesized on the basis of the image of each of these N views, which notably decreases the performance of current synthesis algorithms.

Furthermore, such synthesis algorithms are complex in terms of computation resources because all the pixels of each of the N texture components and all the points of the N depth maps are systematically used to synthesize the image of a view, whereas some of these pixels and/or some of these points are not always useful to take into account in the synthesis.

AIM AND SUMMARY OF THE INVENTION

One of the aims of the invention is to address drawbacks of the aforementioned prior art.

To this end, an object of the present invention relates to a method for synthesizing an image of a view from data of a multi-view video, performed in an image synthesis device.

Such a method comprises an image processing phase as follows:
- generate image synthesis data from texture data of at least one image of a view of the multi-view video,
- compute an image of a synthesized view from the generated synthesis data and from at least one image of a view of the multi-view video,
- analyze the image of the synthesized view with respect to a synthesis performance criterion,
- if the criterion is met, release the image of the synthesized view,
- otherwise, iterate the processing phase, the step of computing an image of a synthesized view in a current iteration comprising the modification, on the basis of synthesis data generated in the current iteration, of an image of the synthesized view computed during a processing phase preceding the current iteration.

Owing to the iterative nature of the aforementioned image processing phase of such a synthesis method and to the consideration of a synthesis performance criterion during each step of analysis of the computed synthesized image, it is thus possible to obtain the image of a synthesized view having very good visual quality, areas that are not or poorly synthesized during a current processing phase being synthesized or refined during subsequent iterations. A mechanism for iterative and adaptive correction of the image of a synthesized view is thus advantageously implemented, providing flexibility to existing synthesis methods.

In addition, the synthesis method according to the invention makes it possible to optimize a compromise—visual quality/computational complexity—because the image synthesis data generation step does not necessarily use all the texture data of an image of a view of the video.

Finally, another advantage of the iterative synthesis method according to the invention opens up the prospects of scalability of complexity, in the event of a terminal which requires the image of a synthesized view to be displayed not allowing this image to be displayed with high resolution or high quality.

More specifically, a standard processing phase in the current iteration proceeds as follows:
- generate synthesis data from texture data of at least one image of a view of the multi-view video and/or from texture data of at least one image of the synthesized view computed during a processing phase preceding the current iteration,
- on the basis of the synthesis data generated in the current iteration, modify an image of the synthesized view computed during a processing phase preceding the current iteration, analyze the image of the modified synthesized view with respect to the synthesis performance criterion.

According to a particular embodiment, in the current iteration, an image of a view used to generate the synthesis data is selected according to the result of the analysis of the image of the modified synthesized view during a processing phase preceding the current iteration.

As such a selection is conditional on the result of a previous analysis of the image of the synthesized view, it is thus possible to use, in each new synthesis data generation step, at least one image of a view of the multi-view video that is as relevant as possible in order to complete/refine the image synthesis performed during one or more previous processing phase(s).

According to another particular embodiment, in the current iteration, the generation of the synthesis data uses the synthesis data generated during a processing phase preceding the current iteration.

Taking previously generated synthesis data into consideration in the current iteration makes it possible to refine the synthesis data that are generated in the current iteration and/or to complement said data.

According to another particular embodiment, in the current iteration, the generation of synthesis data comprises modification of the synthesis data generated during a processing phase preceding the current iteration on the basis of texture data used in the current iteration.

Such an embodiment advantageously makes it possible to refine the synthesis data generated during one or more processing phases preceding the current iteration, by taking into account one or more new view(s) that are considered.

According to another particular embodiment, the synthesis data generated in the current iteration are combined with synthesis data generated during a processing phase preceding the current iteration.

Such an embodiment advantageously makes it possible for the image of a synthesized view which contains fewer and fewer occlusion areas to be obtained in the current iteration. The visual quality of the synthesized image is thus improved as the iterations progress.

According to another particular embodiment, the synthesis data generated during a processing phase belong to the group comprising:
  depth data associated with the texture data of the image of the view of the multi-view video that are used in said processing phase,
  contour data associated with the texture data of the image of the view of the multi-view video that are used in said processing phase,
  a visual element of the image of the view of the multi-view video that is used in said processing phase, said visual element not varying from one image of a view of the multi-view video to another,
  statistical data computed for texture data of the image of the view of the multi-view video that are used in said processing phase.

Such examples of generated synthesis data are of course not exhaustive. They are cited here as being particularly appropriate to use in order to optimize the synthesis of the image of a view implemented by the synthesis method according to the invention, in terms of a visual quality/computational complexity compromise.

According to another particular embodiment, the synthesis data generated during a processing phase are associated with an uncertainty value for the correlation of said synthesis data with the corresponding texture data of said at least one image of said view that were used to generate said synthesis data.

Such uncertainty values constitute relevant additional information to be taken into consideration in a subsequent processing phase and are a guideline for the choice, during this subsequent processing phase, of in particular:
  such and such texture data, in such or such an image of a view, to be used in the step of generating new synthesis data,
  such and such an image of a view of the multi-view video to be used in the step of modifying the image of the view synthesized in the previous iteration,
  etc.

According to another particular embodiment, during a processing phase, the generation of synthesis data uses at least one depth image of a view of the multi-view video and/or at least one piece of information associated with the multi-view video.

In this other embodiment, the generation of synthesis data advantageously uses data other than texture data of at least one image of a view of the multi-view video. These may be depth data that complement the texture data to enrich the synthesis data generation step. In addition to these depth data or as an alternative thereto, they may be at least one piece of information associated with the multi-view video. Such information is representative of a difference or a correlation between the views of the multi-view video (camera parameters, occlusion map, difference in decoding methods, etc.).

According to another particular embodiment, in the current iteration, the modification of the image of the synthesized view computed in a previous iteration uses synthesis data generated previously in the current iteration.

In this other embodiment, in order to further refine the image of the synthesized view obtained by way of the synthesis method of the invention, a synthesized image computed during a processing phase preceding the current iteration is used in addition to the synthesis data generated in the current iteration and said at least one image of a view of the multi-view video to modify the synthesized image computed in the previous iteration.

According to another particular embodiment, in the current iteration, the modification of the image of the synthesized view computed in a previous iteration comprises the computing of an image of a synthesized view from said synthesis data generated in the current iteration and from the image of said synthesized view computed in said previous iteration.

In this other embodiment, the image of the view synthesized in the previous iteration is used as input parameter for the step of modifying the image of the synthesized view computed previously, thus complementing the synthesis data generated in the current iteration and the image of at least one view of the multi-view video that are used as the input for this step. The image of the synthesized view computed in the current iteration thus has optimized visual quality.

According to another particular embodiment, in the current iteration, the modification of the image of the synthesized view computed in a previous iteration comprises the following:
  compute an image of a synthesized view from the synthesis data generated in the current iteration and from the image of a view of the multi-view video,
  combine the image of the computed synthesized view with the image of the synthesized view computed in the previous iteration.

In this other embodiment, the image of the view synthesized in the previous iteration is used once the image of the synthesized view has been obtained in the current iteration, by being combined/merged with said image, so as to totally or partially complete the occlusion areas still present in the synthesized image in the current iteration.

According to another particular embodiment, the current iteration is performed in response to a message from the synthesis device, such a message containing:

either information about the location of one or more areas/one or more pixels of the image of the synthesized view computed previously in the current iteration that do not meet the synthesis performance criterion, or a percentage of non-synthesized pixels of the image of the view synthesized previously in the current iteration.

Such an embodiment allows the synthesis method to be rendered interactive by iterating an image processing phase in response to a message containing explicit information used to guide the synthesis device in the choice of parameters to be considered for performing the current processing phase. Thus, the image of a synthesized view can be progressively improved from one iteration to the next on the basis of parameters chosen according to the result of the analysis of the previously synthesized images.

According to another particular embodiment, the current iteration is furthermore performed in response to reception of uncertainty values associated with the synthesis data generated in the previous iteration.

Such an embodiment allows the message sent to restart a current iteration to be accompanied by uncertainty values associated with the synthesis data generated in the previous iteration, in order to provide even better guidance for the choice of parameters to be considered for performing the processing phase in the current iteration.

The various aforementioned embodiments or implementation features may be added, independently or in combination with one another, to the synthesis method defined above.

The invention also relates to a device for synthesizing an image of a view from data of a multi-view video, said device comprising a processor configured to perform the following:

perform an image processing phase as follows:

generate image synthesis data from texture data of at least one image of a view of the multi-view video, compute an image of a synthesized view from the generated synthesis data and from at least one image of a view of the multi-view video, analyze the image of said synthesized view with respect to a synthesis performance criterion, if said criterion is met, release the image of said synthesized view, otherwise, iterate the processing phase, the computing of an image of a synthesized view in a current iteration comprising the modification, on the basis of synthesis data generated in the current iteration, of an image of the synthesized view computed during a processing phase preceding the current iteration.

Such a synthesis device is in particular capable of performing the aforementioned synthesis method.

The invention also relates to a method for decoding an encoded data signal of a multi-view video, performed in an image decoding device, comprising the following:

decode images of multiple encoded views, producing a set of images of multiple decoded views, synthesize an image of a view on the basis of said set of images in accordance with the aforementioned synthesis method, according to any one of the aforementioned embodiments thereof.

According to a particular embodiment, the synthesis data are generated from texture data of at least one of the decoded images of said set.

Owing to this embodiment, the synthesis data do not need to be transmitted, which allows a not insignificant reduction in the cost of signaling the encoded data.

According to another particular embodiment, the synthesis data being previously encoded, they are generated as follows:

read the encoded synthesis data in said data signal or in another data signal, decode the read synthesis data.

This other embodiment allows the complexity of the decoder to be reduced.

The invention also relates to a computer program comprising instructions for performing the synthesis method according to the invention or the decoding method integrating the synthesis method according to the invention, according to any one of the particular embodiments described above, when said program is executed by a processor.

Such instructions can be permanently stored in a non-transitory memory medium of the synthesis device performing the aforementioned synthesis method or of the decoder performing the aforementioned decoding method.

This program may use any programming language and be in the form of source code, object code or intermediate code between source code and object code, such as in a partially compiled form, or in any other desirable form.

The invention also targets a computer-readable storage medium or information medium containing instructions of a computer program as mentioned above. The recording medium may be any entity or device capable of storing the program. For example, the medium may comprise a storage means, such as a ROM, for example a CD-ROM or a microelectronic circuit ROM, or else a magnetic recording means, for example a USB key or a hard disk.

Moreover, the recording medium may be a transmissible medium such as an electrical or optical signal, which may be conveyed via an electrical or optical cable, by radio or by other means. The program according to the invention may in particular be downloaded from a network such as the Internet.

Alternatively, the recording medium may be an integrated circuit in which the program is incorporated, the circuit being adapted to carry out or to be used for carrying out the aforementioned synthesis method or decoding method.

BRIEF DESCRIPTION OF THE DRAWINGS

Other features and advantages will become apparent from reading particular embodiments of the invention, which are given by way of illustrative and non-limiting examples, and the appended drawings, in which.

DETAILED DESCRIPTION OF ONE EMBODIMENT OF THE INVENTION

Figure 1:
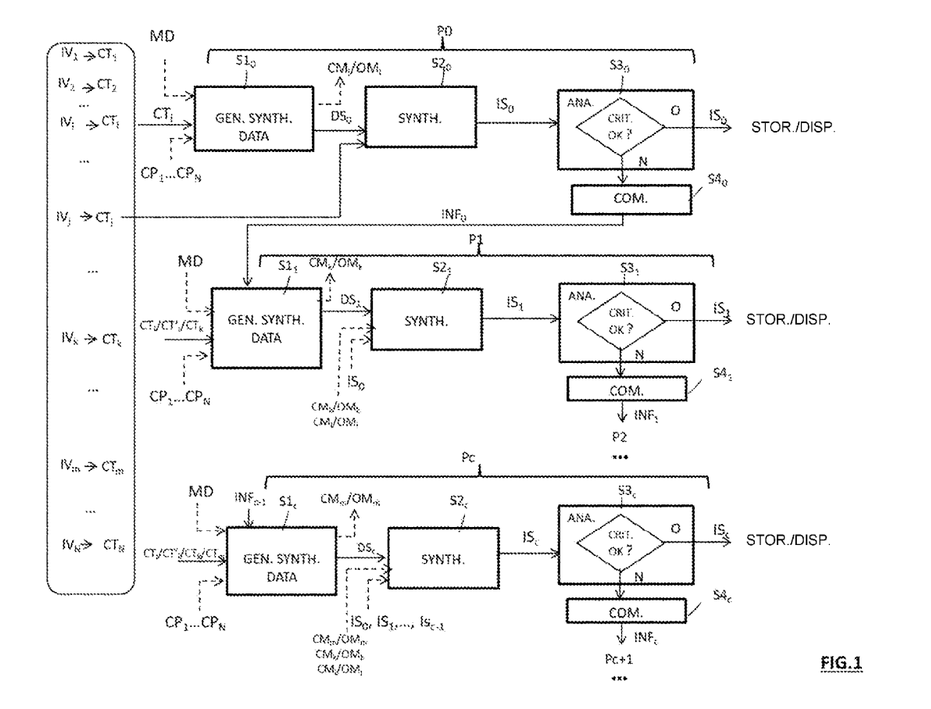
FIG. 1 shows the flow of an iterative image synthesis method, in a particular embodiment of the invention.

Referring to FIG. 1, the text below describes the performance of an iterative image synthesis method according to an embodiment of the invention, which uses images of a plurality of views $V_1$ to $V_N$ of a multi-view video (N≥1), showing a 3D scene according to a plurality of viewing angles or a plurality of positions/orientations, respectively.

FIG. 1 shows, as the input for the iterative synthesis process:

an image $IV_1$ of the view $V_1$,
an image $IV_2$ of the view $V_2$,
. . . ,
an image $IV_k$ of the view $V_k$,
. . . ,
an image $IV_N$ of the view $V_N$.

Such images are images which have been reconstructed by a decoder, prior to the performance of the iterative synthesis method.

Figure 2:
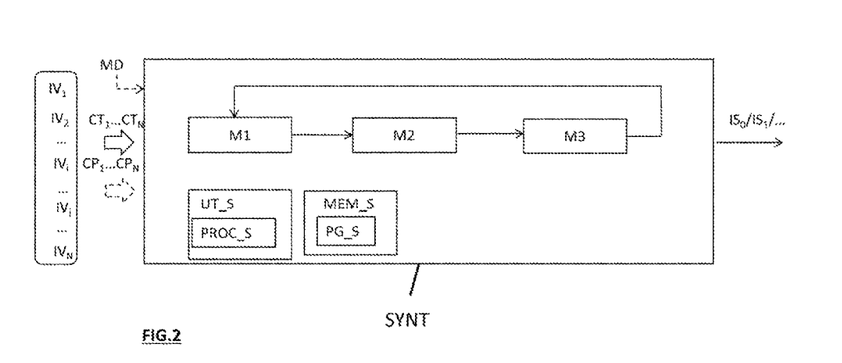
FIG. 2 shows a synthesis device performing the synthesis method of FIG. 1.

This method is carried out by an image synthesis device SYNT, a simplified representation of which is shown in FIG. 2.

According to one particular embodiment of the invention, the actions accomplished by the synthesis method are performed by computer program instructions. To this end, the synthesis device SYNT has the conventional architecture of a computer and comprises in particular a memory MEM_S, a processing unit UT_S, equipped for example with a processor PROC_S, and controlled by a computer program PG_S stored in memory MEM_S. The computer program PG_S comprises instructions for performing the actions of the synthesis method as described above when the program is executed by the processor PROC_S.

On initialization, the code instructions of the computer program PG_S are for example loaded into a RAM memory (not shown) before being executed by the processor PROC_S. The processor PROC_S of the processing unit UT_S performs in particular the actions of the synthesis method described below, according to the instructions of the computer program PG_S.

Figure 3A:
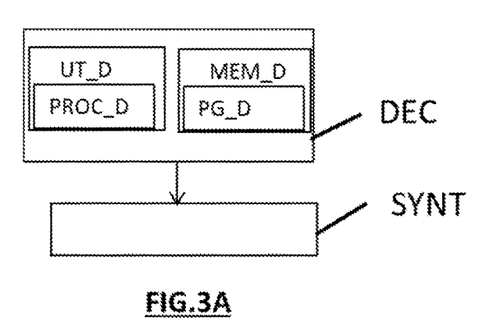
FIG. 3A shows an arrangement of the synthesis device of FIG. 2, in a particular embodiment of the invention.
Figure 3B:
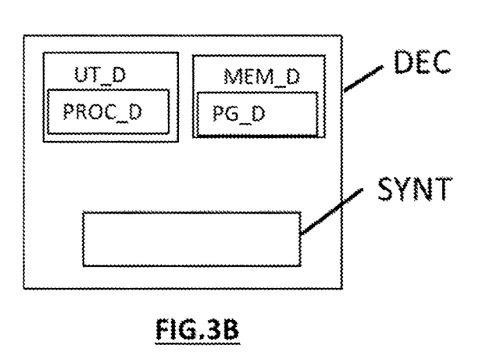
FIG. 3B shows an arrangement of the synthesis device of FIG. 2, in another particular embodiment of the invention.

Such a synthesis device SYNT may be arranged, as shown in FIG. 3A, at the output of a decoder DEC that has previously reconstructed the images $IV_1$ to $IV_N$, or may be part of such a decoder DEC, as shown in FIG. 3B.

According to a particular embodiment of the invention, the actions accomplished by the decoder DEC are performed by computer program instructions. To this end, the decoder DEC has the conventional architecture of a computer and comprises in particular a memory MEM_D, a processing unit UT_D, equipped for example with a processor PROC_D, and controlled by a computer program PG_D stored in memory MEM_D. The computer program PG_D comprises instructions for performing the actions of the decoding method as described below when the program is executed by the processor PROC_D.

On initialization, the code instructions of the computer program PG_D are for example loaded into a RAM memory (not shown) before being executed by the processor PROC_D. The processor PROC_D of the processing unit UT_D performs in particular the actions of the decoding method described below, according to the instructions of the computer program PG_D.

According to the invention, referring to FIG. 2, the synthesis device SYNT comprises the following three modules connected in cascade and controlled by the processor PROC_S:

a synthesis data estimation module M1,
a module M2 for computing a synthesized image,
a synthesized image analysis module M3 configured to communicate with the module M1.

The synthesis device SYNT according to the invention is thus advantageously configured to carry out image synthesis, in which synthesis data are estimated jointly and interactively with the computing of an image of a synthesized view, the synthesis being iterated as needed in order to modify/complete/refine the synthesized image obtained, owing to the communication existing between the module M3 and the module M1.

As shown in FIG. 1, such a synthesis method comprises an image processing phase P0 which is applied to an image of a view which is part of the plurality of views $V_1, \ldots, V_N$ of a multi-view video, the plurality of views showing a 3D scene according to a plurality of viewing angles or a plurality of positions/orientations, respectively.

FIG. 1 shows, as the input for the iterative synthesis process:

an image $IV_1$ of a view $V_1$,
an image $IV_2$ of a view $V_2$,
. . . ,
an image $IV_k$ of a view $V_k$,
. . . ,
an image $IV_N$ of a view $V_N$.

Such images are images which have been reconstructed by the decoder DEC of FIGS. 3A and 3B prior to the performance of the iterative synthesis method.

The image processing phase P0 comprises the following.

Figure 4A:
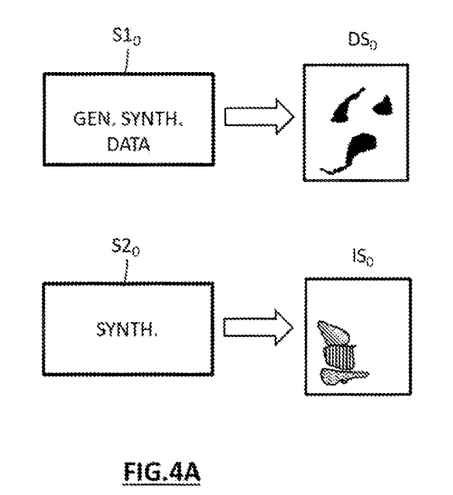
FIG. 4A shows an example of synthesis and image data of a synthesized view that are obtained during the performance of a first image processing phase of the synthesis method of FIG. 1.

In $S1_0$, image synthesis data $DS_0$ are generated by the module M1 of FIG. 2 from texture data of at least one of the images $IV_1$ to $IV_N$. These are for example synthesis data $DS_0$ generated from texture data $T_i$ of the image $IV_i$. According to the invention, these texture data $T_i$ correspond to only certain pixels of the texture component $CT_i$ of the previously reconstructed image $IV_i$. A map of synthesis data $DS_0$ generated for these certain pixels is obtained at the end of step $S1_0$. Such a map is shown in FIG. 4A.

Figure 5A:
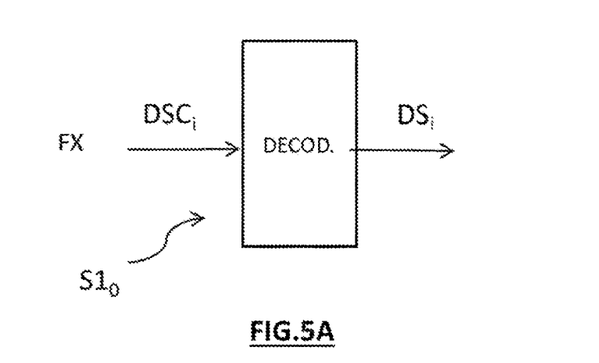
FIG. 5A shows a synthesis data generation step, in a particular embodiment of the invention.

According to a first embodiment shown in FIG. 5A, the generation of the image synthesis data $DS_0$ amounts:
to reading, from a stream FX received from a video encoder (not shown), image synthesis data $DSC_i$ which have previously been generated at the encoder from original texture data of the texture component CTi of the image $IV_i$, and then encoded, and
to decoding these read synthesis data.

Figure 5B:
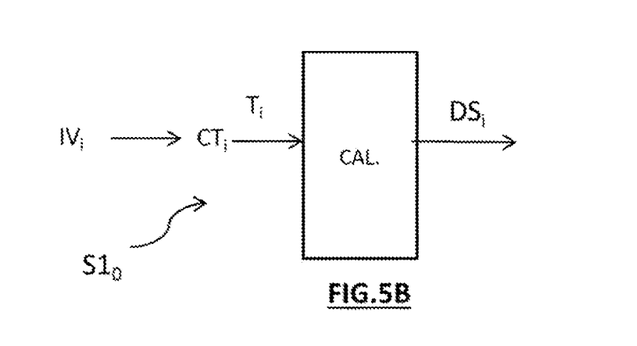
FIG. 5B shows a synthesis data generation step, in another particular embodiment of the invention.

According to a second embodiment shown in FIG. 5B, the generation of the image synthesis data $DS_0$ amounts to computing these image synthesis data $DS_0$ from texture data of the previously reconstructed image $IV_i$.

According to the invention, the synthesis data $DS_0$ are generated from texture data $T_i$ which correspond to only certain pixels of the texture component $CT_i$ of the previously reconstructed image $IV_i$. The computation resources for performing the synthesis data generation step are therefore particularly lightened compared to the depth estimates performed in the prior art, which consider all the pixels of an image.

Preferably, the synthesis data $DS_0$ generated are depth data associated with the texture data $T_i$. However, other types of synthesis data $DS_0$ can of course be envisaged.

Examples of synthesis data $DS_0$ may be, non-exhaustively:
partial depth maps, i.e. images for which some pixels have an associated depth value and others have a reserved value indicating that no depth value could be associated with these pixels;
contour maps or angles present in an image: the structural information contained in the contour maps, the angles and the active contours can be used by the iterative image synthesis method according to the invention, for example in order to avoid ghosting artifacts. This can be achieved by improving the synthesis algorithm or by improving the depth maps. Edge detection approaches may include the use of Sobel-, Canny-, Prewitt- or Roberts-type operators. Angles can be estimated using a Harris-type angle detection operator;
features extracted by SIFT—(Scale-Invariant Feature Transform) or SURF—(Speeded-Up Robust Features) type algorithms. Such algorithms are used for the estimation of homographies, fundamental matrices and image matching. The features extracted by these methods therefore share similar characteristics with depth maps, implying a relationship between the images. The SURF algorithm is an extension of the SIFT algorithm, replacing the Gaussian filter in SIFT with a mean filter;
statistical characteristics computed for one or more textures (local or on the complete image), histogram data, etc.

Such statistical characteristics are for example representative of the percentage of texture, or contour, in given areas of the image of a view. They are used by the synthesis device SYNT in order to synthesize an image with a percentage of texture or contour that comes close to this. The same applies to the histogram data relating to different areas of the image of a view, the synthesis device SYNT trying to preserve these histogram data for each of these areas for the image of the view synthesized by said device.

Machine learning methods, such as convolutional neural networks (CNNs), can also be used to extract features useful for image synthesis from reconstructed texture data.

These different synthesis data can, during step $S1_0$, be used individually or in combination.

The data $DS_0$ generated at the end of step $S1_0$ and more generally the data generated in each iteration will subsequently be called synthesis data. Such an expression covers not only partial or non-partial depth maps, but also the aforementioned data. Other types of data not mentioned here are also possible.

Optionally, and therefore as shown in dotted lines in FIG. 1, the synthesis data $DS_0$ can also be generated from at least one piece of information MD associated with the sequence of multi-view images $IV_1$ to $IV_N$ and/or from one or more available depth maps $CP_1$ to $CP_N$ that are respectively associated with the texture components $CT_1$ to $CT_N$ of the images $IV_1$ to $IV_N$. A piece of information MD is for example metadata representative of a difference or a correlation between the views $V_1$ to $V_N$, such as one or more camera parameters, one or more occlusion maps, differences in decoding methods, etc. Such information MD is for example transmitted in a stream received by the iterative synthesis device SYNT shown in FIG. 2. The information MD may also be already available at the synthesis device.

In the event of the synthesis data $DS_0$ being depth data:
if these depth data are generated from texture data of a single image of one view among N, the depth estimation is performed for example using a monocular neural network, a contour-based depth estimation algorithm or T-junctions, etc.;
if these depth data are generated from texture data of at least two images among N, the depth estimation is performed for example using a stereo matching algorithm, a pattern-based matching algorithm (template matching), etc.

Optionally, and for this reason as shown in dotted lines in FIG. 1, the synthesis data $DS_0$ are associated with an uncertainty value for the correlation of said synthesis data with the corresponding texture data of the image $IV_i$. In a manner that is known per se, these uncertainty values are grouped together in a map such as for example:
an occupancy map OM, which is a binary map indicating, for the pixels considered in the texture component $CT_i$, whether the corresponding depth values are correlated (value set to 1) or not (value set to 0) with the values of these pixels;
a confidence map CM, which is a map of representative discrete values for the pixels considered in the texture component $CT_i$, a degree of confidence for the correlation of the value of these pixels with the data $DS_0$ generated for each of these pixels.

According to one embodiment, the generation of the synthesis data is performed on the basis of a threshold which is for example a SAD ("Sum of Absolute Differences") distortion value, which is representative of the quality of the stereo matching, for example, or more generally on the basis of any other indicator allowing a degree of confidence in each pixel to be established for the synthesis data item to be generated for this pixel.

According to a preferred embodiment, the map of synthesis data is filled in only for pixels whose confidence is above a given threshold.

According to another embodiment, the map of synthesis data is filled in for all the pixels of the image, but is accompanied either by a confidence map at each point or by the SAD value, which needs to be compared with the threshold, at each point. According to yet another embodiment, the map of synthesis data is incomplete, but is nevertheless accompanied either by a confidence map at each existing point or by the SAD value, which needs to be compared with the threshold, at each existing point.

The iterative synthesis method according to the invention continues with the computing module M2 of FIG. 2 computing $S2_0$ an image of a synthesized view $IS_0$ from the synthesis data $DS_0$ generated in $S1_0$ and at least one image $IV_j$ among the images $IV_1$ to $IV_N$. The image $IV_j$ may be the image $IV_i$ or another image among N. The computing $S2_0$ is performed by a conventional synthesis algorithm, such as for example of RVS ("Reference View Synthesizer"), VVS ("Versatile View Synthesizer"), etc., type. An example of a synthesized image $IS_0$ is shown in FIG. 4A.

In $S3_0$, the synthesized image $IS_0$ is analyzed with respect to a synthesis performance criterion CS by means of the analysis module M3 of FIG. 2.

Different synthesis performance criteria are possible at this stage. These criteria are, as non-exhaustive examples:
- CS1: number of missing pixels in the synthesized image $IS_0$ below a threshold; and/or
- CS2: size of the largest area to be filled in the synthesized image $IS_0$ below a threshold, such a criterion signifying that an inpainting algorithm will succeed in reconstructing the missing data of this image efficiently; and/or
- CS3: visual quality of the synthesized image $IS_0$ deemed sufficient, as measured for example by an objective evaluation algorithm with or without reference ("full-reference, reduced-reference, no-reference objective metric").

If the criterion is met, the synthesized image $IS_0$ is considered valid and is released for storage while waiting to be displayed by a terminal of a user who has requested this image and/or to be directly displayed by the terminal.

If the criterion is not met, in $S4_0$, the analysis module M3 transmits to the module M1 information $INF_0$ about the pixels/pixel areas of the synthesized image $IS_0$ which have not been synthesized or which have not been considered as correctly synthesized at the end of the image processing phase P0. Such information $INF_0$ is contained in a dedicated message or request. More specifically, the information $INF_0$ is shown in the form of the coordinates of these pixels that are not or poorly synthesized according to the aforementioned criteria or even in the form of a percentage of non-synthesized pixels. Optionally, in $S4_0$ the analysis module M3 also transmits the occupancy map $OM_i$ or the confidence map $CM_i$ that were generated in $S1_0$.

The synthesis device SYNT then triggers a new image processing phase P1, in order to improve/refine the synthesized image $IS_0$ which was obtained previously.

To this end, in $S1_1$, the synthesis data generation module M1 again generates synthesis data $DS_1$ from texture data (pixels) of at least one of the images $IV_1$ to $IV_N$.

These may be for example:
- texture data $T_i$ used in $S1_0$, and/or
- texture data of the texture component $CT_i$ of the same image $IV_i$, but different from the texture data $T_i$, and/or
- texture data of another image $IV_k$ among N ($1 \leq k \leq N$).

As in $S1_0$, the synthesis data $DS_1$ can also be generated from at least one piece of information MD associated with the sequence of multi-view images $IV_1$ to $IV_N$ and/or from one or more available depth maps $CP_1$ to $CP_N$ that are respectively associated with the texture components $CT_1$ to $CT_N$ of the images $IV_1$ to $IV_N$. They may also be depth data, partial depth maps, contour maps, etc., used individually or in combination, the choice of the type of these data not necessarily being the same as that used in $S1_0$.

Figure 4B:
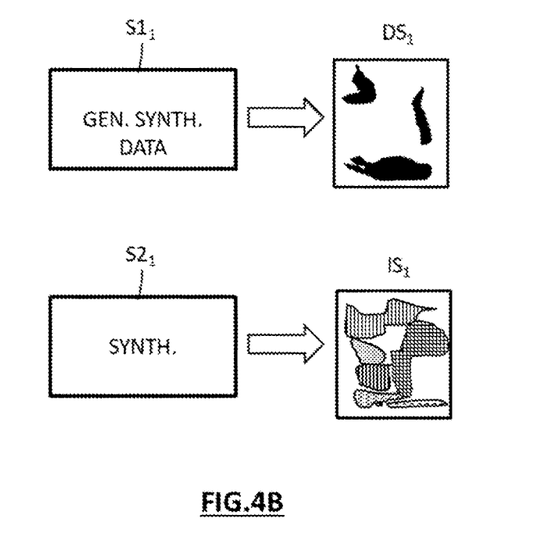
FIG. 4B shows an example of synthesis and image data of a synthesized view that are obtained during the performance of an iteration of the image processing phase of FIG. 4A.

A map of synthesis data $DS_1$ generated for these texture data is obtained at the end of step $S1_1$. Such a map is shown in FIG. 4B.

The selection of the image(s) to generate the synthesis data $DS_1$ can be performed in different ways.

If for example the two texture components $CT_1$ and $CT_2$ were used to generate the synthesis data $DS_0$ in $S1_0$, the synthesis data generation module M1 can be configured to select the two respective texture components $CT_3$ and $CT_4$ of the images $IV_3$ and $IV_4$ closest to the images $IV_1$ and $IV_2$ in $S1_1$.

According to another example, in view of the fact that each of the images $IV_1$ to $IV_N$ has different captured information from the scene, if the module M1 has used the texture components $CT_1$ and $CT_2$ to generate the synthesis data $DS_0$ in $S1_0$, it can be configured to use the texture components $CT_1$ and $CT_3$ or else $CT_2$ and $CT_3$ in $S1_1$ to generate the synthesis data $DS_1$.

According to yet another example, the module M1 can simultaneously use multiple texture components, for example four texture components $CT_3$, $CT_4$, $CT_5$, $CT_6$.

According to yet another example, in addition to or instead of the texture components $CT_1$ to $CT_N$, the module M1 can use one or more previously synthesized images. For example, in $S1_1$, the module M1 can use the synthesized image $IS_0$ to generate the synthesis data $DS_1$.

According to yet another example, the choice of texture data $T_i$ and/or $T'_i$ and/or $T_k$ in $S1_1$ is conditional on the information $INF_0$. If for example the information $INF_0$ is representative of the location of one or more occlusion areas in the synthesized image $IS_0$, the module M1 is configured to select in $S1_1$ one or more image texture components that are further away than that/those used in $S1_0$ to fill these areas.

Such a selection can be guided by the information MD corresponding for example to camera parameters, such as for example the angle of the camera and its position in the scene.

When the selection of the texture data $T_i$ and/or $T'_i$ and/or $T_k$ is conditional on the information $INF_0$, a table Table 1 is shown below, merely by way of example, which associates with each synthesis performance criterion CS1 to CS3 not satisfied the content of the corresponding information $INF_0$ and the action to be performed in $S1_1$ by the synthesis data generation module M1.

TABLE 1

| Synthesis performance criterion not OK | $INF_0$ | Action M1 |
| --- | --- | --- |
| CS1 to CS3 | Number/percentage of missing pixels in the synthesized image $IS_0$ above a threshold | Select synthesis data associated with missing pixels |

Figure 6A:
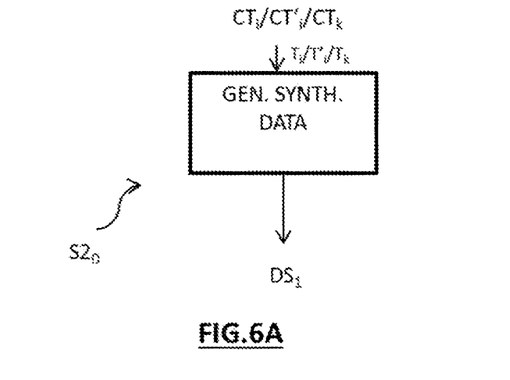
FIG. 6A shows a way of generating synthesis data during the performance of an iteration of an image processing phase of the synthesis method of FIG. 1, in a particular embodiment of the invention.

According to an embodiment shown in FIG. 6A, the synthesis data $DS_1$ are generated in a similar manner to the data $DS_0$.

Figure 6B:
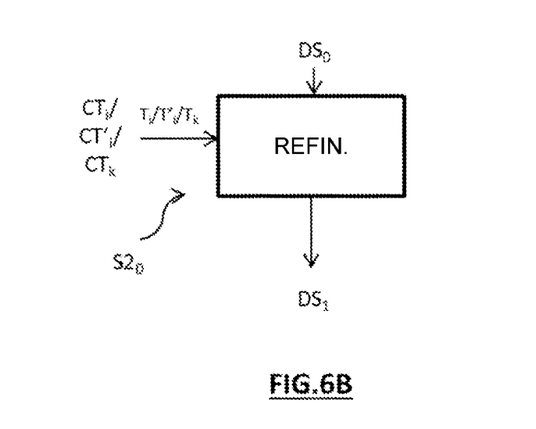
FIG. 6B shows a way of generating synthesis data during the performance of an iteration of an image processing phase of the synthesis method of FIG. 1, in another particular embodiment of the invention.

According to another embodiment shown in FIG. 6B, the synthesis data $DS_1$ are generated by modifying all or some of the synthesis data $DS_0$ with the texture data $T_i$ and/or $T'_i$ and/or $T_k$.

Figure 6C:
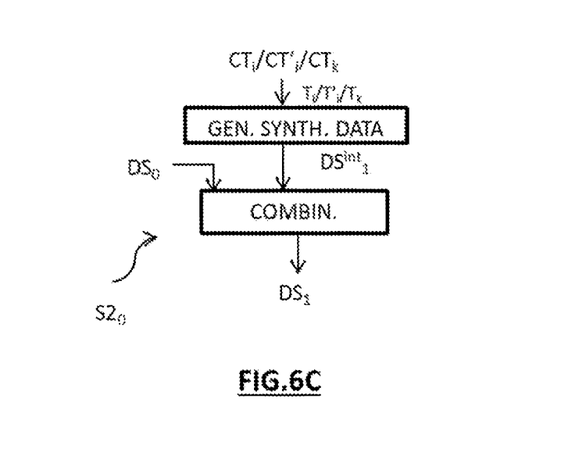
FIG. 6C shows a way of generating synthesis data during the performance of an iteration of an image processing phase of the synthesis method of FIG. 1, in yet another particular embodiment of the invention.

According to another embodiment shown in FIG. 6C, intermediate synthesis data $DS^{int}_1$ are generated in a similar manner to the synthesis data $DS_0$. These intermediate synthesis data are then combined/merged with the synthesis data $DS_0$, providing the synthesis data $DS_1$.

To merge the synthesis data $DS_0$ and $DS^{int}_1$, various embodiments can be implemented.

According to a first embodiment, the missing synthesis data in a map of synthesis data, for example the map containing the synthesis data $DS^{int}_1$, are retrieved among the existing synthesis data $DS_0$ of the other map, or vice versa.

According to a second embodiment, if some among the synthesis data $DS_1$ were already present among the synthesis data $DS_0$ and, in the map of synthesis data $DS_1$, they are each associated with a higher degree of confidence than that associated with them in the map of synthesis data $DS_0$, these synthesis data $DS_0$ are replaced by the corresponding synthesis data $DS_1$ obtained in $S1_1$. For example, the SAD value can be computed by way of a stereo matching algorithm that carries out matching between the image $IV_j$ or $IV_k$ used in $S1_1$ to generate the synthesis data and another image among N. The vectors found in order to match these two images come from a motion estimation which returns a level of correlation SAD, which is considered an example of a degree of confidence.

According to a third embodiment, if some among the synthesis data $DS_1$ were already present among the synthesis data $DS_0$, and these synthesis data $DS_1$ are depth values associated with elements situated in the foreground of the scene, for example, whereas the synthesis data $DS_0$ already present are depth values associated with elements situated in the background of the scene, for example, these synthesis data $DS_0$ are replaced by these synthesis data $DS_1$ so as to preserve the information of a priority depth plane (in this example the foreground of the scene).

The image processing phase P1 continues with the computing module M2 of FIG. 2 computing $S2_1$ a new image of a synthesized view $IS_1$. As in $S2_0$, the computing $S2_1$ is performed by a conventional synthesis algorithm, such as for example RVS or VVS. An example of a synthesized image $IS_1$ is shown in FIG. 4B.

Figure 7A:
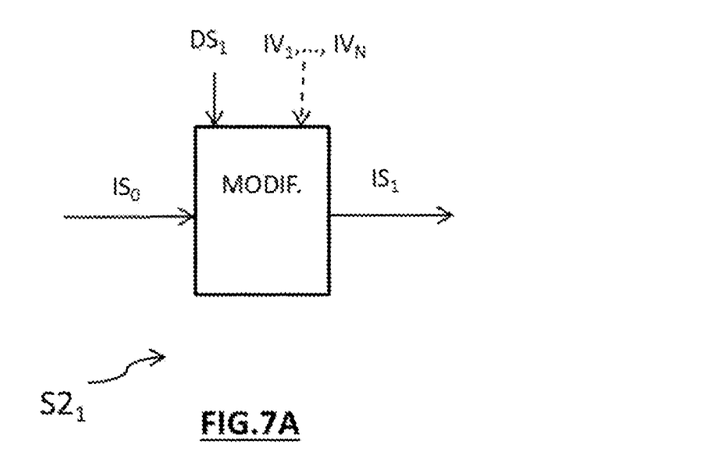
FIG. 7A shows a way of computing a synthesized image during the performance of an iteration of an image processing phase of the synthesis method of FIG. 1, in a particular embodiment of the invention.

According to a first embodiment of the synthesis $S2_1$ shown in FIG. 7A, the computing module M2 modifies the synthesized image $IS_0$ computed in $S2_0$, at least on the basis of synthesis data $DS_1$ generated in $S1_1$. At least one image among the images $IV_1$ to $IV_N$ can also be used during this modification.

Figure 7B:
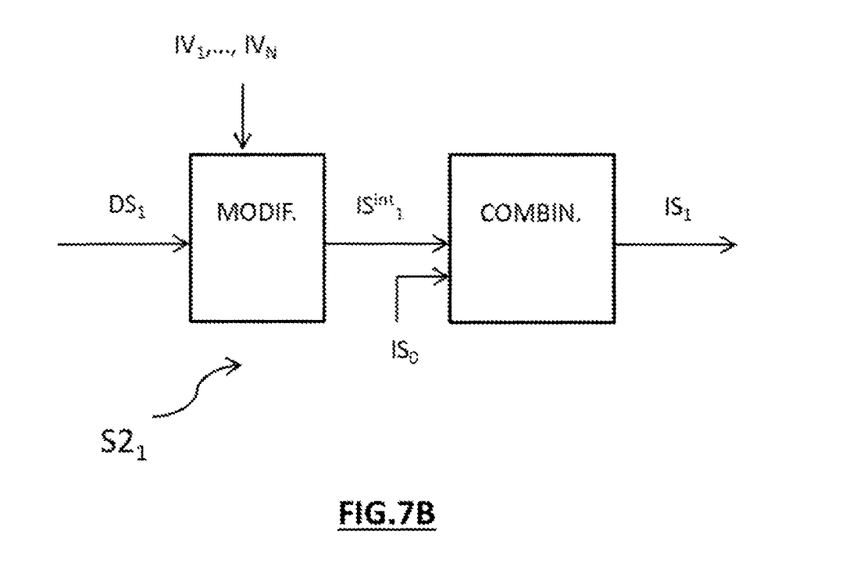
FIG. 7B shows a way of computing a synthesized image during the performance of an iteration of an image processing phase of the synthesis method of FIG. 1, in another particular embodiment of the invention.

According to a second embodiment shown in FIG. 7B, the computing module M2 computes an intermediate synthesized image $IS^{int}_1$ from the synthesis data $DS_1$ obtained in $S1_1$ and optionally from one or more images $IV_1$ to $IV_N$, and then combines the intermediate synthesized image $IS^{int}_1$ with the synthesized image $IS_0$ previously computed in $S2_0$ to generate a synthesized image $IS_1$.

There are various ways to combine the synthesized images $IS^{int}_1$ and $IS_0$.

According to a first embodiment, the synthesized image $IS_1$ is obtained by retrieving the missing pixels in a synthesized image among the images $IS^{int}_1$ and $IS_0$, for example the image $IS^{int}_1$, among the existing pixels in the image $IS_0$.

According to a second embodiment, if synthesized pixels in the image $IS^{int}_1$ are also present in the image $IS_0$, in the same position, the synthesis image $IS_1$ is obtained by selecting among the images $IS^{int}_1$ and $IS_0$ the common synthesized pixel that is associated with the highest degree of confidence using the aforementioned confidence map CM.

According to a third embodiment, if synthesized pixels in the image $IS^{int}_1$ are also present in the image $IS_0$ in the same position, the synthesis image $IS_1$ is obtained by selecting among the images $IS^{int}_1$ and $IS_0$ the common synthesized pixel that is associated with a priority depth plane, for example the foreground of the scene. The image processing phase P1 continues with an analysis, in $S3_1$, of the synthesized image $IS_1$ with respect to a synthesis performance criterion CS by means of the analysis module M3 of FIG. 2.

The performance criteria used in the image processing phase P1 may be the same as the aforementioned criteria CS1 to CS3. Two other criteria below may also be considered non-exhaustively:

CS4: quality of the temporal consistency between the synthesized image $IS_1$ and the synthesized image $IS_0$ considered sufficient; and/or CS5: the value of some synthesized pixels in the synthesized image $IS_1$ is equal or substantially equal to that of some synthesized pixels in the same respective position in the synthesized image $IS_0$, leading to two similar synthesized images.

If the criterion/criteria CS1 to CS5 is/are met, the synthesized image $IS_1$ is considered valid and is released for storage while waiting to be displayed by a terminal of a user who has requested this image and/or to be directly displayed by the terminal.

If the criterion/criteria CS1 to CS5 is/are not met, the analysis module M3 transmits a piece of information $INF_1$ to the module M1 in $S4_1$. If the analysis $S3_1$ of the synthesized image $IS_1$ uses the synthesis performance criterion CS4, the information $INF_1$ contains the coordinates of the pixels of the area(s) of the synthesized image $IS_1$ that are considered to lack temporal consistency with the pixels in corresponding positions in the synthesized image $IS_0$. If the analysis $S3_1$ of the synthesized image $IS_1$ uses the synthesis performance criterion CS5, the information $INF_1$ contains the coordinates of the pixels of the area(s) of the synthesized image $IS_1$ that are considered to lack pixel consistency with the pixels in corresponding positions in the synthesized image $IS_0$.

The synthesis device SYNT then triggers a new image processing phase P2 similar to the image processing phase P1 so as to further improve/refine/complete the synthesized image $IS_1$ which was obtained previously.

It should be noted that, on the basis of the image processing phase P2, if the selection of such and such texture data is conditional on the information $INF_1$, the aforementioned criteria CS4 and CS5 can be considered for generating new synthesis data $DS_2$. To this end, a table Table 2 is shown below, merely by way of example, which associates with each synthesis performance criterion CS1 to CS5 not satisfied the content of the corresponding information $INF_1$ and the action to be performed in P2 by the synthesis data generation module M1.

TABLE 2

| Synthesis performance criterion not OK | $INF_0$ | Action M1 |
| --- | --- | --- |
| CS1 to CS3 | Number/percentage of missing pixels in the synthesized image $IS_0$ below a threshold | Select synthesis data associated with missing pixels |
| CS4 | Quality of the temporal consistency between the synthesized image $IS_0$ and the synthesized image $IS_1$ considered insufficient | For the area of the synthesized image which does not meet CS4, select new synthesis data for this area which allow a synthesized image having temporal consistency with the |

TABLE 2-continued

| Synthesis performance criterion not OK | INF$_0$ | Action M1 |
|---|---|---|
| CS5 | Inconsistency in terms of pixel value between pixels of the synthesized image IS$_1$ and pixels in the same respective positions in the synthesized image IS$_0$ | synthesized image obtained in the previous image processing phase to be obtained For the area of the synthesized image which does not meet CS5, select new synthesis data for this area which allow a synthesized image having consistency in terms of pixel value with the synthesized image obtained in the previous image processing phase to be obtained |

In accordance with the invention, an image processing phase can be iterated as long as one or more synthesis performance criterion/criteria is/are not met.

Referring to FIG. 1, and generally, a current image processing phase P$_c$ proceeds as follows:

In S1$_c$, the synthesis data generation module M1 again generates synthesis data DS$_c$ from texture data (pixels) of at least one of the images IV$_1$ to IV$_N$. These may be for example:

texture data T$_i$, T'$_i$, T$_k$ already used in the previous synthesis data generation steps, and/or texture data of the texture component of at least one image which has already been used in the previous synthesis data generation steps, but which differ from the texture data already used for this texture component, and/or texture data of another image IV$_m$ among N (1≤m≤N).

As in S1$_0$ and in S1$_1$, the synthesis data DS$_c$ can also be generated from at least one piece of information MD associated with the sequence of multi-view images IV$_1$ to IV$_N$ and/or from one or more available depth maps CP$_1$ to CP$_N$ that are respectively associated with the texture components CT$_1$ to CT$_N$ of the images IV$_1$ to IV$_N$. They may also be depth data, partial depth maps, contour maps, etc., used individually or in combination, the choice of the type of these data not necessarily being the same as that used in the previous synthesis data generation steps S1$_0$, S1$_1$, etc.

Selection of the image(s) for generating the synthesis data DS$_c$ is performed in the same way as in the aforementioned embodiments.

In particular, the synthesis data generation module M1 can be configured to select, in S1$_c$, one or more texture components of the images IV$_1$ to IV$_N$ which, depending on the result of the analysis of the synthesized images performed in the previous image processing phases, may be closer or further away from the images already used in the previous image processing phases.

According to yet another example, in addition to or instead of the texture components CT$_1$ to CT$_N$, the module M1 can use one or more images IS$_0$, IS$_1$, . . . already synthesized during the previous processing phases.

As already explained above, the choice of texture data in S1$_c$ can be conditional on the information INF$_{c-1}$, this choice also being able to be complemented by the information INF$_0$, INF$_1$, . . . generated at the end of the synthesis image computing steps IS$_0$, IS$_1$, . . . , respectively. The selection of the new texture data will be based on the criteria of the table Table 2 mentioned above by considering the image I$_{c-1}$ synthesized during the previous image processing phase Pc-1 in the light of at least one of the other images IS$_0$, IS$_1$, . . . already synthesized during the previous processing phases.

As already explained when describing step S1$_1$, the synthesis data DS$_c$ can be generated in S1$_c$ by modifying, using the texture data T$_i$ and/or T'$_i$ and/or T$_k$ and/or T$_m$ used as input for the module M1, all or some of the synthesis data DS$_{c-1}$ generated in the previous image processing phase P$_{c-1}$, but also the synthesis data DS$_0$, DS$_1$, . . . before the phase P$_{c-1}$.

As already explained above when describing step S1$_0$, according to one embodiment, generation S1$_c$ of the synthesis data can be performed on the basis of a threshold which is a SAD distortion value, for example. The SAD distortion value can be the same in each iteration. However, such a SAD value may vary. In the first image processing phases P0, P1, P2, the required SAD value is for example the lowest possible and is increased in the subsequent processing phases, for example from the current image processing phase Pc. According to another example, the SAD value can be gradually increased in each iteration of an image processing phase. Similarly to the aforementioned image processing phase P1, the current image processing phase Pc continues with the computing module M2 of FIG. 2 computing S2$_c$ a new image of a synthesized view IS$_c$. As already explained previously, the computing S2$_c$ is performed by way of a conventional synthesis algorithm, such as for example RVS or VVS.

As already explained when describing step S2$_1$, according to a first embodiment, the computing module M2 modifies the synthesized image IS$_{c-1}$ obtained during the previous image processing phase P$_{c-1}$ at least on the basis of the synthesis data DS$_c$ generated in S1$_c$. At least one image among the images IV$_1$ to IV$_N$ can also be used for this modification. According to a second embodiment, the computing module M2 computes an intermediate synthesized image IS$^{int}_c$ from the synthesis data DS$_c$ obtained in S1$_c$ and optionally from one or more images IV$_1$ to IV$_N$, and then combines the intermediate synthesized image IS$^{int}_c$ with the synthesized image IS$_{c-1}$ computed previously in the previous image processing phase Pc-1 and optionally with one or more images IS$_0$, IS$_1$, . . . already synthesized before the previous image processing phase Pc-1.

The image processing phase Pc continues with an analysis, in S3$_c$, of the synthesized image IS$_c$ with respect to a synthesis performance criterion CS by means of the analysis module M3 of FIG. 2.

The performance criteria used in the image processing phase Pc are the aforementioned criteria CS1 to CS5. If one or more of these criteria is/are met, the synthesized image IS$_c$ is considered valid and is released for storage while waiting to be displayed by a terminal of a user who has requested this image and/or to be directly displayed by the terminal. If one or more of these criteria is/are not met, the analysis module M3 transmits a piece of information INF$_c$ to the module M1 in S4$_c$. A new image processing phase Pc+1 is then triggered.

The invention claimed is:

1. A method for synthesizing an image of a view from data of a multi-view video, performed in an image synthesis device, the method comprising an image processing phase as follows:

generating image synthesis data from texture data of at least one image of a view of the multi-view video, computing an image of a synthesized view from said generated synthesis data and from at least one image of a view of the multi-view video, analyzing the image of said synthesized view with respect to a synthesis performance criterion, if said criterion is met, releasing the image of said synthesized view, otherwise, iterating said processing phase, the computing an image of a synthesized view in a current iteration comprising modifying, on the basis of the synthesis data generated in the current iteration, an image of the synthesized view computed during a processing phase preceding the current iteration in order to refine the image of the synthesized view computed during said processing phase preceding the current iteration.

2. The method as claimed in claim 1, wherein, in the current iteration, the image of the view that is used to generate the synthesis data is selected according to the result of the analysis of the image of the modified synthesized view during a processing phase preceding the current iteration.

3. The method as claimed in claim 1, wherein, in the current iteration, the generation of the synthesis data uses the synthesis data generated during a processing phase preceding the current iteration.

4. The method as claimed in claim 3, wherein, in the current iteration, the generation of synthesis data comprises modification of the synthesis data generated during a processing phase preceding the current iteration on the basis of texture data used in the current iteration.

5. The method as claimed in claim 3, wherein the synthesis data generated in the current iteration are combined with synthesis data generated during a processing phase preceding the current iteration.

6. The method as claimed in claim 1, wherein the synthesis data generated during the processing phase belong to the group consisting of:
depth data associated with the texture data of the image of the view of the multi-view video that are used in said processing phase,
contour data associated with the texture data of the image of the view of the multi-view video that are used in said processing phase,
a visual element of the image of the view of the multi-view video that is used in said processing phase, said visual element not varying from one image of a view of the multi-view video to another,
statistical data computed for texture data of the image of the view of the multi-view video that are used in said processing phase.

7. The method as claimed in claim 1, wherein the synthesis data generated during the processing phase are associated with an uncertainty value for the correlation of said synthesis data with the corresponding texture data of said at least one image of said view that were used to generate said synthesis data.

8. The method as claimed in claim 1, wherein, during the processing phase, the generation of synthesis data uses at least one depth image of a view of the multi-view video and/or at least one piece of information associated with the multi-view video.

9. The method as claimed in claim 1, wherein, in the current iteration, the modification of the image of the synthesized view computed in the previous iteration uses synthesis data generated previously in the current iteration.

10. The method as claimed in claim 1, wherein, in the current iteration, the modification of the image of the synthesized view computed in the previous iteration comprises computing an image of a synthesized view from said synthesis data generated in the current iteration and from the image of said synthesized view computed in said previous iteration.

11. The method as claimed in claim 1, wherein, in the current iteration, the modification of the image of the synthesized view computed in the previous iteration comprises the following:
computing an image of a synthesized view from said synthesis data generated in the current iteration and from the image of a view of the multi-view video,
combining the image of said computed synthesized view with the image of the synthesized view computed in said previous iteration.

12. The method as claimed in claim 1, wherein the current iteration is performed in response to a message from the synthesis device, said message containing:
either information about the location of one or more areas/one or more pixels of the image of the synthesized view computed previously in the current iteration that do not meet the synthesis performance criterion,
or a percentage of non-synthesized pixels of the image of the view synthesized previously in the current iteration.

13. The method as claimed in claim 1, wherein the current iteration is furthermore performed in response to reception of uncertainty values associated with the synthesis data generated in the previous iteration.

14. The method according to claim 1, further comprising decoding an encoded data signal of said multi-view video, said decoding comprising:
decoding images of multiple encoded views, producing a set of images of multiple decoded views, and
performing at least one iteration of the image processing phase on the image of a view from said set of images.

15. The method as claimed in claim 14, wherein the synthesis data are generated from texture data of at least one of the decoded images of said set.

16. The method as claimed in claim 14, wherein the synthesis data, being previously encoded, are generated as follows:
reading the encoded synthesis data in said encoded data signal or in another data signal,
decoding the read synthesis data.

17. A device for synthesizing an image of a view from data of a multi-view video, said device comprising:
a processor configured to perform an image processing phase as follows:
generating image synthesis data from texture data of at least one image of a view of the multi-view video,
computing an image of a synthesized view from said generated synthesis data and from at least one image of a view of the multi-view video,
analyzing the image of said synthesized view with respect to a synthesis performance criterion,
if said criterion is met, releasing the image of said synthesized view,
otherwise, iterating the processing phase,
the computing of the image of the synthesized view in a current iteration comprising modifying, on the basis of synthesis data generated in the current iteration, an image of the synthesized view computed during a processing phase preceding the current iteration in order to refine the image of the synthesized view computed during said processing phase preceding the current iteration.

18. The device according to claim 17, wherein the processor is further configured to perform:

decoding an encoded data signal of the multi-view video, said decoding comprising:
decoding images of multiple encoded views, producing a set of images of multiple decoded views,
synthesizing the image of the view from data of the multi-view video by performing at least one iteration of the image processing phase.

19. A non-transitory computer-readable information medium containing instructions of a computer program stored thereon, comprising program code instructions which when executed by a processor of a synthesis device, configure the synthesis device to implement a method of synthesizing an image of a view from data of a multi-view video, performed in an image synthesis device, the method comprising an image processing phase as follows:
generating image synthesis data from texture data of at least one image of a view of the multi-view video,
computing an image of a synthesized view from said generated synthesis data and from at least one image of a view of the multi-view video,
analyzing the image of said synthesized view with respect to a synthesis performance criterion,
if said criterion is met, releasing the image of said synthesized view,
otherwise, iterating said processing phase, the computing an image of a synthesized view in a current iteration comprising modifying, on the basis of the synthesis data generated in the current iteration, an image of the synthesized view computed during a processing phase preceding the current iteration in order to refine the image of the synthesized view computed during said processing phase preceding the current iteration.

* * * * *